United States Patent
Bechtold et al.

(10) Patent No.: US 6,218,451 B1
(45) Date of Patent: Apr. 17, 2001

(54) PAINT STABILIZER

(75) Inventors: Karl Bechtold, Schliengen (DE); Gilbert Ligner, Mulhouse (FR)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/171,032

(22) PCT Filed: Apr. 10, 1997

(86) PCT No.: PCT/IB97/00387

§ 371 Date: Oct. 12, 1998

§ 102(e) Date: Oct. 12, 1998

(87) PCT Pub. No.: WO97/39069

PCT Pub. Date: Oct. 23, 1997

(30) Foreign Application Priority Data

Apr. 12, 1996 (DE) ................................. 196 14 520

(51) Int. Cl.[7] .................... C08K 5/3435; C08K 5/07
(52) U.S. Cl. .................... 524/102; 526/217; 526/263; 526/265; 546/187; 546/188; 546/190
(58) Field of Search .................... 524/102; 526/217, 526/263, 265; 546/187, 188, 190

(56) References Cited

U.S. PATENT DOCUMENTS

| | | | |
|---|---|---|---|
| 3,423,225 | * 1/1969 | Coney et al. | 427/154 |
| 4,618,638 | * 10/1986 | Dexter et al. | 524/101 |
| 4,843,116 | 6/1989 | Bopp | 524/102 |
| 5,026,751 | 6/1991 | Bopp | 524/102 |
| 5,106,891 | 4/1992 | Valet | 524/91 |
| 5,705,545 | * 1/1998 | Avar et al. | 524/102 |
| 5,874,493 | * 2/1999 | Webster | 524/102 |

FOREIGN PATENT DOCUMENTS

| | | |
|---|---|---|
| 3412227 | * 11/1984 | (DE) . |
| 4-372668 | * 12/1992 | (JP) . |
| 8-81643 | * 3/1996 | (JP) . |

OTHER PUBLICATIONS

Valet "Light stabilization of automotive topcoats" CA 113:134190, 1990.*
Anon "Polymer stabilizers" CA 125:249396, 1996.*
Abstract for EP0453396 (1991).
Abstract for EP0240723 (1986).
Abstract for GB2269819 (1994).

* cited by examiner

*Primary Examiner*—Celia Chang
(74) *Attorney, Agent, or Firm*—Susan S. Jackson; Scott E. Hanf

(57) ABSTRACT

The present invention relates to the use of a photoreactive and UV absorbing piperidine compound of the formula A below and of a mixture consisting of this piperidine compound and at least one selected UV absorber as light stabilizers in coating materials, preferably in automotive coating materials.

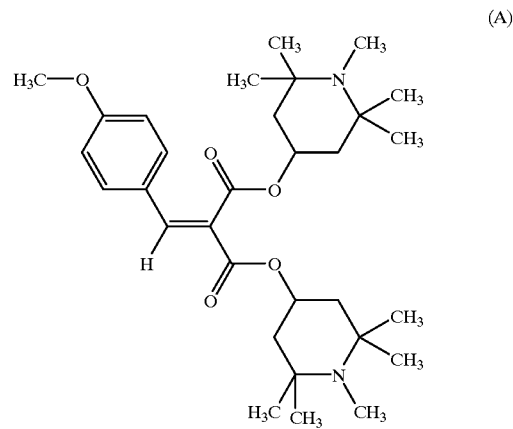

(A)

The invention also provides a method of stabilizing coating materials against the degradation of the polymer material present in the coating material, as induced by the action of atmospheric oxygen, heat and/or UV light, and the coating materials themselves that are stabilized in this way.

15 Claims, No Drawings

PAINT STABILIZER

This application is a 371 of PCT/IB97/00387 filed Apr. 10, 1997.

The present invention relates to the use of a photoreactive, UV-absorbing piperidine compound and of a mixture consisting of this piperidine compound and at least one UV absorber as light stabilizers in coating materials, preferably automotive coating materials.

The invention also provides a method of stabilizing coating materials against the degradation of the polymer material present in the coating material, as induced by the effect of atmospheric oxygen, heat and/or UV light, and the coating materials themselves that have been stabilized in this way.

The effects of atmospheric oxygen, moisture and, in particular, UV light in coating materials lead to a degradation of the polymer material present in the coating material. This manifests itself, for example, in cracking, loss of gloss, colour changes, delamination and blistering. It is known that such processes in coating materials can be retarded by using appropriate stabilizers. Known coating compositions therefore often include a mixture of a UV absorber and a sterically hindered amine (HALS: hindered amine light stabilizer). It is known that these compounds of the HALS type react as free-radical scavengers and are therefore generally employed for the stabilization of polymeric substrates.

It has now been found that a specific, sterically hindered amine of the formula (A) below, which is photoreactive and absorbs UV light, is particularly suitable, alone or in combination with UV absorbers or mixtures of different UW absorbers, as a light stabilizer for coating materials, especially automotive coating materials.

The invention therefore provides for the use of a piperidine compound of the following formula (A) (referred to below as HALS A)

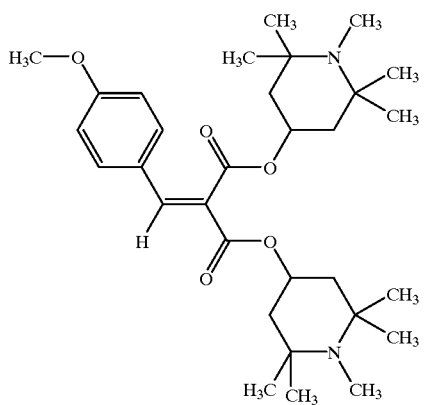

(A)

for increasing the light stability of coating materials. A further embodiment of the invention relates to the use of a mixture consisting of this photoreactive, UV-absorbing piperidine compound and at least one UV absorber selected from the group consisting of 2-hydroxyphenylbenzotriazoles (1), 2-hydroxyphenyltriazines (2), 2-hydroxybenzophenones (3), oxalanilides (4) and cinnamic acid derivatives (5) as a light stabilizer in coating materials.

Suitable 2-hydroxyphenylbenzotriazoles correspond to the formulae [sic] (1a) or (1b)

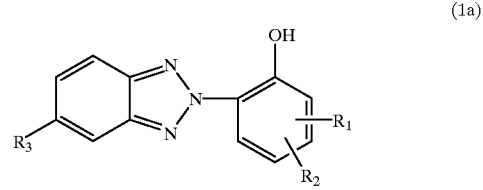

(1a)

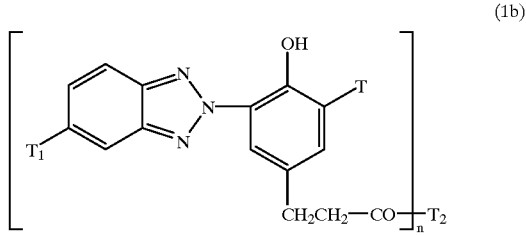

(1b)

where, in the compounds of the formula (1a), $R_1$ is hydrogen, alkyl having 1 to 24 carbon atoms, preferably alkyl having 1 to 20 carbon atoms, such as methyl, ethyl, propyl, butyl, hexyl, octyl, nonyl, dodecyl, tetradecyl, hexadecyl, octadecyl, nonadecyl and eicosyl, and corresponding branched isomers, or phenylalkyl having 1 to 4 carbon atoms in the alkyl moiety, in particular benzyl.

$R_2$ is hydrogen, halogen, in particular chlorine and bromine, alkyl having 1 to 18 carbon atoms or phenylalkyl having 1 to 4 carbon atoms in the alkyl moiety, in particular benzyl, α-methylbenzyl, cumyl.

$R_3$ is hydrogen, chlorine or alkyl having 1 to 4 carbon atoms, in particular methyl, butyl, at least one of the radicals $R_1$ and $R_2$ being other than hydrogen, and where, in the compounds of the formula (1b), T is hydrogen or alkyl having 1 to 6 carbon atoms, in particular methyl and butyl $T_1$ is hydrogen, chlorine or alkyl having 1 to 4 carbon atoms, in particular methyl n is 1 or 2 and $T_2$, if n is 1, is chlorine or a radical of the formula —$OT_3$, and, if n is 2, is a radical of the formula —O—$T_9$—O—, where $T_3$ is hydrogen, alkyl having 1 to 18 carbon atoms which is optionally substituted by from 1 to 3 hydroxyl groups, alkyl having 3 to 18 carbon atoms which is interrupted one or more times by —O— and is optionally substituted by hydroxyl, alkenyl having 2 to 18 carbon atoms which is optionally substituted by hydroxyl (suitable alkenyl radicals are derived from the alkyl radicals ab which are listed in the definitions of $R_1$), phenylalkyl having 1 to 4 carbon atoms in the alkyl moiety, in particular benzyl, phenylethyl, cumyl, α-methylbenzyl, or is a radical of the formula —$CH_2CH(OH)$—$T_7$, $T_7$ is hydrogen, alkyl having 1 to 18 carbon atoms or phenyl, $T_9$ is alkylene having 2 to 8 carbon atoms, alkenylene having 4 to 8 carbon atoms, cyclohexylene, or alkylene having 2 to 18 carbon atoms which is interrupted one or more times by —O—, where the alkylene or alkenylene radicals may also be branched.

Suitable 2-hydroxyphenyltriazines correspond to the formula (2)

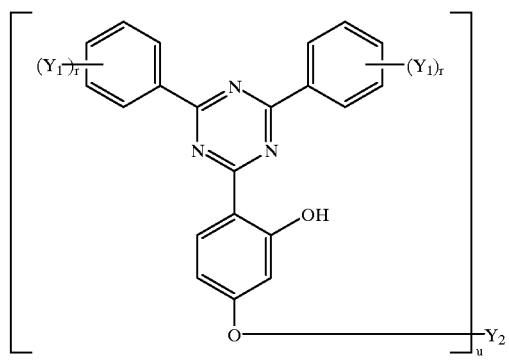

(2)

where
- u is 1 or 2,
- r is an integer from 1 to 3,
- $Y_1$ independently of one another are hydrogen, hydroxyl, halomethyl, alkyl having 1 to 12 carbon atoms, alkoxy having 1 to 18 carbon atoms or halogen,
- $Y_2$, if u is 1, is alkyl having 1 to 18 carbon atoms, or is alkyl having 1 to 12 carbon atoms which is substituted by hydroxyl, alkoxy having 1 to 18 carbon atoms, halogen, by —COOH, —COO$Y_8$, —CONH$_2$, —CONH$Y_9$, —CON$Y_9Y_{10}$, —CN and/or —OCO$Y_{11}$, or is alkyl having 4 to 20 carbon atoms which is interrupted by one or more oxygen atoms and is optionally substituted by hydroxyl or alkoxy having 1 to 12 carbon atoms, or is alkenyl having 3 to 6 carbon atoms, or is glycidyl, or is phenylalkyl having 1 to 5 carbon atoms in the alkyl moiety and unsubstituted or substituted by hydroxyl, chlorine and/or methyl, or is —CO$Y_{12}$ or —SO$_2Y_{13}$, or
- $Y_2$, if u is 2, is alkylene having 2 to 16 carbon atoms, alkenylene having 4 to 12 carbon atoms, xylylene, alkylene having 3 to 20 carbon atoms which is interrupted by one or more —O— and/or is substituted by hydroxyl, or is —CH$_2$CH—(OH)CH$_2$—O—$Y_{15}$—OCH$_2$CH(OH)CH$_2$, or is —(CH$_2$)$_m$—CO$_2$—$Y_{18}$—OCO—(CH$_2$)$_m$, in which m is 1, 2 or 3,
- $Y_8$ is alkyl having 1 to 18 carbon atoms, alkenyl having 3 to 18 carbon atoms, alkyl having 3 to 20 carbon atoms which is interrupted by one or more oxygen atoms and/or is substituted by hydroxyl, or is glycidyl or phenylalkyl having 1 to 5 carbon atoms in the alkyl moiety,
- $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cycloalkyl having 5 to 12 carbon atoms,
- $Y_{11}$ is alkyl having 1 to 18 carbon atoms, alkenyl having 2 to 18 carbon atoms or phenyl,
- $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms, or phenylamino,
- $Y_{13}$ is alkyl having 1 to 18 carbon atoms, phenyl, alkylphenyl having 1 to 8 carbon atoms in the alkyl radical,
- $Y_{15}$ is alkylene having 2 to 20 carbon atoms, phenylene or a group -phenylene-M-phenylene, in which M is —O—, —S—, —SO$_2$—, —CH$_2$— or —C(CH$_3$)$_2$—, and
- $Y_{18}$ is alkylene having 2 to 10 carbon atoms or is alkylene having 4 to 20 carbon atoms which is interrupted one or more times by oxygen.

Suitable 2-hydroxybenzophenone correspond to the formula (3)

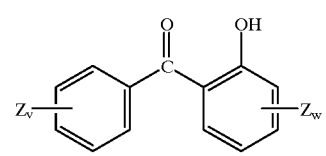

(3)

where
- v is an integer from 1 to 3,
- w is 1 or 2, and
- Z independently of one another is hydrogen, halogen, hydroxyl or alkoxy having 1 to 12 carbon atoms.

Suitable oxalanilides correspond to the formula (4)

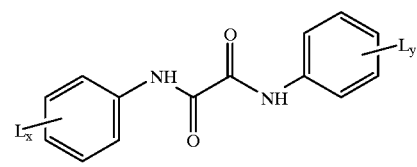

(4)

where
- x is an integer from 1 to 3
- y is 1 or 2 and
- L independently of one another is H, alkyl having 1 to 20 carbon atoms, hydroxyl or alkoxy having 1 to 20 carbon atoms. In this formula the substituents L are preferably in ortho and/or para position.

Examples of alkyl, alkoxy, phenylalkyl, alkylene, alkenylene, alkoxyalkyl and cycloalkyl radicals and of alkylthio, oxaalkylene or azoalkylene radicals in the compounds of the formulae (2), (3), (4) and (5) can be taken from the above remarks.

Suitable cinnamic acid derivatives correspond to the formula (5)

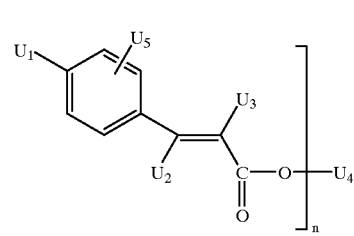

(5)

where
- n is an integer from 1–4
- $U_1$ is H, alkyl, hydroxyl, alkoxy, NH$_2$, NHalkyl, N-dialkyl
- $U_2$ is H, alkyl, aryl, alkyl-substituted aryl, alkoxyaryl, p-hydroxyaryl, p-aminoaryl
- $U_3$ is H, CN, COO$U_6$
- $U_4$
  - if n is 1, is alkyl (n, iso, cyclo) of 1 to 20 carbon atoms that is uninterrupted or interrupted one or more times by —O—, if n is 2, is alkylene (n, iso, cyclo) of 1 to 20 carbon atoms that is uninterrupted or interrupted one or more times by —O—, if n is 3, is the radical of a triol such as trimethylolpropane, propanetriol if n is 4, is the radical of a tetraol such as pentaerythritol $U_5$ is hydrogen or a substituent such as $U_1$, preferably alkoxy $U_6$ is alkyl (n, iso, cyclo) of 1 to 20 carbon atoms.

The UV absorbers of the formulae (1a), (1b), (2), (3), (4) and (5) are known per se and are described, for example, together with their preparation, in EP-A-0 323 408, EP-A-0 057 160, EP-A-0 434 608, U.S. Pat. No. 4,619,956, DE-A-3 135 810, GB-A-1 336 391 and EP-A-0 322 557.

UV absorbers which correspond to the formulae UVA-1 to UVA-11 below are particularly preferred.

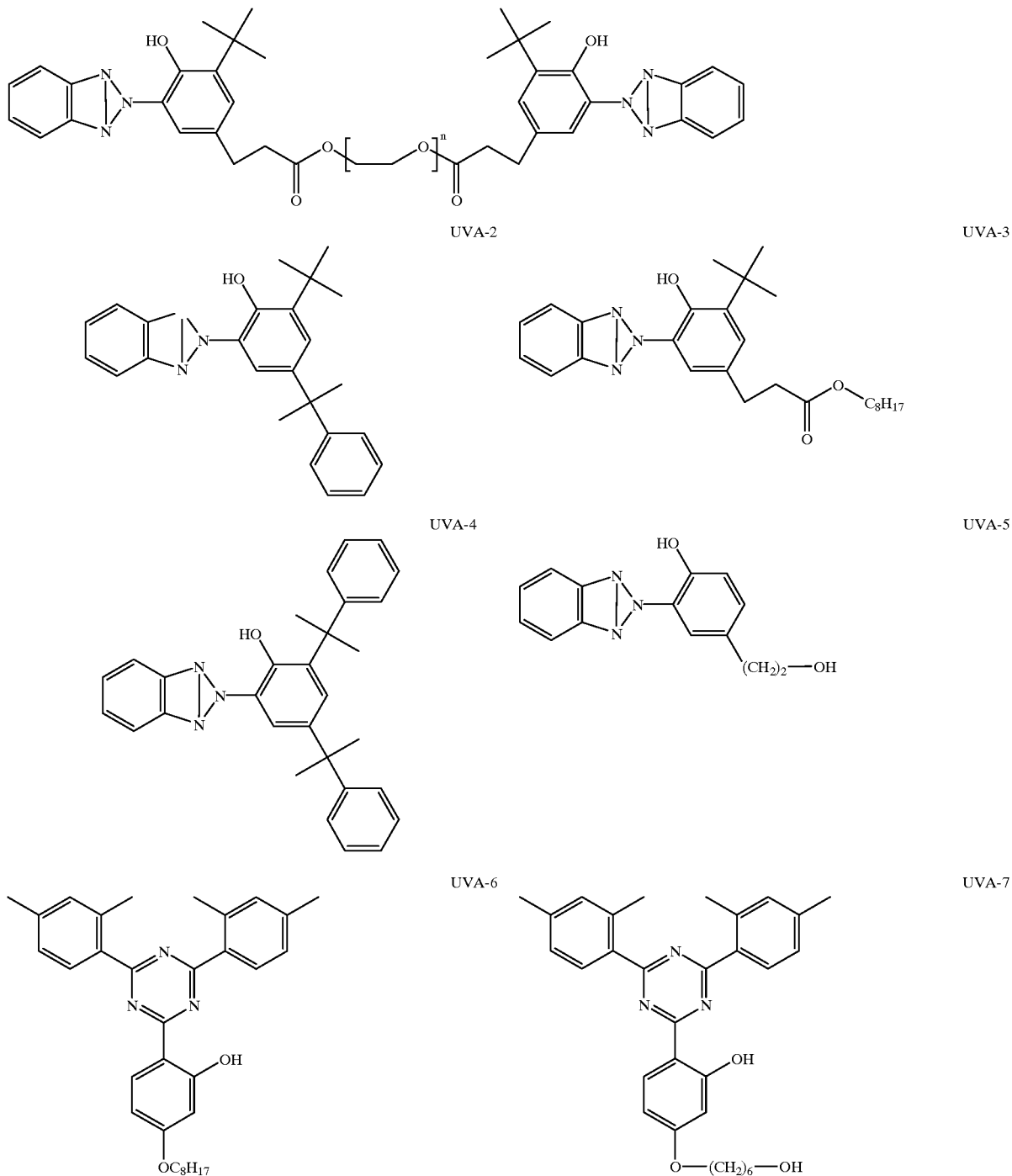

-continued

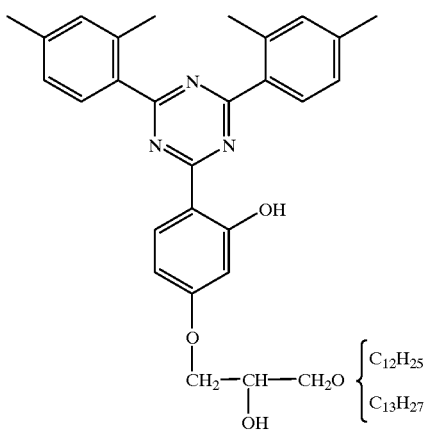
UVA-8

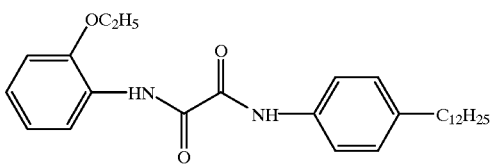
UVA-9

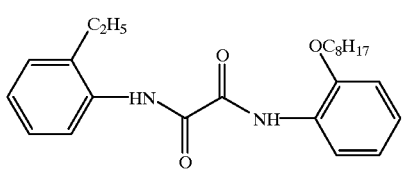
UVA-10

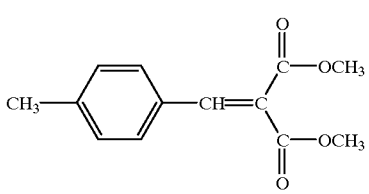
UVA-11

The present invention also relates to a method of stabilizing coating materials against the degradation of the polymer material present in the coating material, as induced by the effect of heat and light, characterized in that a piperderine [sic] compound of the formula A or a mixture consisting of this piperidine compound and at least one UW absorber selected from the group consisting of 2-hydroxyphenylbenzotriazoles, 2-hydroxyphenyltriazines, 2-hydroxybenzophenone, oxalanilides and cinnamic acid derivatives is added in solid or dissolved form and in an amount sufficient for stabilization to the coating materials that are to be stabilized and is incorporated into the coating materials or coating compositions by customary methods which are known per se. The overall amount of light stabilizer to be chosen and the mixing ratio of HALS A to UW absorber depends on the nature of the coating composition and on the requirements regarding its stability. In general, the overall amount of light stabilizer is between 0.2 and 5% by weight, preferably from 0.5 to 1.5% by weight, based on the solids content of the coating material. The mixing ratio of HALS A to UV absorber depends on the nature of the coating material, on the required stability and on the nature of the UV absorber employed. Consequently, it can vary between 10:1 and 1:10. Typical mixing ratios are between 4:1 and 1:4, preferably from 3:1 to 1:3. In polyurethane coating materials, for example, a mixture according to the invention consisting of 2 parts of the piperidine compound of the formula A and 1 part of UV absorber is advisable, whereas for coating materials based on curable acrylic resins, for example, a mixing ratio of HALS A to UV absorber of 1 to 3 should be employed for obtaining results in accordance with the invention. The individual components of the synergistic mixture can be added individually or as a mixture to the corresponding coating compositions. In the case of two-coat finishes, the addition can be made to the basecoat and/or topcoat. The topcoat preferably comprises the light stabilizer according to the invention. The customary further additives can also be added to the coating compositions without thereby impairing the protective effect of the light stabilizer employed in accordance with the invention.

The light stabilizer according to the invention is preferably used in powder form, in liquid form or in liquid formulations which can be introduced volumetrically, quickly and in a precise dose, into liquid coating systems.

The coating compositions according to the invention can comprise any desired type of coating materials, for example pigmented or unpigmented coating materials or metal-effect (metallic) coating materials. They may include an organic solvent or may be solvent-free or may be aqueous coating materials. Examples of coating materials with specific binders are the following:

1. coating materials based on cold- or hot-crosslinkable alkyd, acrylate, polyester, epoxy or melamine resins or mixtures of such resins, with or without the addition of an acidic curing catalyst;
2. Two-component polyurethane coating materials based on hydroxyl-containing acrylate, polyester or polyether resins and on aliphatic or aromatic polyisocyanates;
3. One-component polyurethane coating materials based on blocked polyisocyanates which are unblocked in the course of stoving;
4. Two-component coating materials based on (poly)ketimines and on aliphatic or aromatic polyisocyanates;
5. Two-component coating materials based on (poly)ketimines and on an unsaturated acrylate resin or a polyacetoacetate resin or a methylacrylamidoglycolate methyl ester;
6. Two-component coating materials based on carboxyl- or amino-containing polyacrylates and polyepoxides;
7. Two-component coating materials based on acrylate resins containing anhydride groups and on a polyhydroxy or polyamino component;
8. Two-component coating materials based on (poly)oxazolidines and on acrylate resins containing anhydride groups or on unsaturated acrylate resins or aliphatic or aromatic polyisocyanates.
9. Two-component coating materials based on unsaturated polyacrylates and polymalonates.

10. Thermoplastic polyacrylate coating materials based on thermoplastic acrylate resins or externally crosslinking acrylate resins in combination with etherified melamine resins.
11. Coating systems based on siloxane-modified acrylate resins.
12. Coating systems based on fluorine-modified acrylate resins.

The coating materials can also be radiation-curable coating materials. In this case the binder consists of monomeric or oligomeric compounds which contain ethylenic double bonds and which, by irradiation with actinic light or with electron beams, pass into a crosslinked, high molecular mass form. In this case it is usually a mixture of such compounds which is involved.

The coating materials can be applied as one-coat or two-coat systems, the stabilizers according to the invention preferably being added to the unpigmented, topmost coat.

The coating materials can be applied to the substrates (metal, plastic, wood etc.) by the customary techniques, for example by brushing, spraying, flow coating, dipping or electrophoresis. With particular preference, the compositions according to the invention are coating materials for motor vehicles. Examples of suitable coating systems and binders are described, for example, in U.S. Pat. Nos. 4,314,933, 4,344,876, 4,426,471, 4,426,472 and 4,429,077.

The present invention also relates to coating films obtainable by application to a surface and curing.

The invention also provides the coating materials light-stabilized with the compound HALS A or with a mixture consisting of HALS A and UV absorbers.

The examples which follow illustrate the invention, all parts and percentages being by weight unless indicated otherwise.

The light stabilizers according to the invention are incorporated as they are into the resin component in the amounts indicated in the following tables (% pure light stabilizer, i.e. active substance, based in each case on the solids contents of the coating material, i.e. resin and hardener). The hardener B is incorporated into this mixture.

Examples 1–4 are carried out on a 2-component high-solids polyurethane coating material (2C HS PU coating material). Both the resin component, FQ 95-0104, and the hardener component, SC 29-0160, are available from BASF.

The clearcoat is adjusted to spray viscosity with xylene and is sprayed onto a pretreated substrate (coil-coated aluminium panel, silver-metallic basecoat [aqueous, moondust silver XSC 2431 WCA, Bollig and Kemper]), ventilated at room temperature for about 1 h and then stoved at 140° C. for 30 minutes (pmt: peak metal temperature). This gives a clearcoat dry-film thickness of 40–50 μm.

The samples are subjected to accelerated weathering in a Xenon Weatherometer (CI 35, from Atlas; CAM 180); the 20° gloss (DIN 67530) is measured and is used to calculate the residual gloss in % relative to the initial value.

Examples 5 and 6 are carried out in a two-component medium-solid polyurethane coating material (2C MS-PU coating material). Both the resin component, 5 K.53.058, and the hardener component, 8 K.71.037, are obtainable from the company Akzo Nobel Coatings.

The clearcoat is adjusted to spray viscosity with xylene and is sprayed onto a pretreated substrate (a silver-metallic basecoat [light gray MS 612 VR modified polyester/melamine, solvent-containing, Akzo Nobel]), ventilated at room temperature for about 1 hour and then stoved at 80° C. for 30 minutes (pmt: peak metal temperature). This gives a clearcoat dry-film thickness of 40–45 μm.

In Example 5 the samples are subjected to accelerated weathering in an UVCON instrument (ASTM G53-93: 8 hours of light at 70° C., 4 hours of dark phase/condensation at 50° C.); the 20° gloss (DIN 67530) is measured and is used to calculate the residual gloss in % relative to the initial value. The yellowing is additionally determined by colorimetry (b* value in accordance with the CIELAB standard is measured and the delta-b* value relative to the initial value is calculated).

In Example 6 the samples are subjected to accelerated weathering in a Xenon Weatherometer (WOM Ci 65; CAM 7/DIN 53 231A); the 200 gloss (DIN 67530) is measured and is used to calculate the residual gloss in % relative to the initial value.

In the Comparison Examples, the following prior art HALS compounds, which are not photoreactive and do not absorb UV light, are employed:

HALS 1: Tinuvin (RTM) 292, a commercial product from Ciba-Geigy, Switzerland
HALS 4: Sanduvor (RTM) 3055, a commercial product from Clariant, Switzerland

EXAMPLE 1

HALS combinations with UV absorbers of the oxanilide class:

| No. | HALS | UV absorber | 20° gloss after 4000 hours | Residual gloss after 4000 h in % |
|---|---|---|---|---|
| 1 | none | none | 15 (3000 h, z*) | 17 (3000 h, z*) |
| 2 | 0.6% HALS 1 | 0.6% UVA 9 | 20 | 24 |
| 3 | 0.6% HALS 4 | 0.6% UVA 9 | 19 | 22 |
| 4 | 0.6% HALS A | 0.6% UVA 9 | 33 | 39 |
| 5 | 0.6% HALS 1 | 0.6% UVA 10 | 24 | 28 |
| 6 | 0.6% HALS 4 | 0.6% UVA 10 | 21 | 25 |
| 7 | 0.6% HALS A | 0.6% UVA 10 | 27 | 32 |

*)z = destroyed

Serial numbers 4 and 7 are examples in accordance with the invention.

EXAMPLE 2

HALS combinations with UV absorbers of the benzotriazole class:

| No. | HALS | UV absorber | 20° gloss after 4000 hours | Residual gloss after 4000 h in % |
|---|---|---|---|---|
| 1 | none | none | 15 (3000 h, z*) | 17 (3000 h, z*) |
| 2 | 0.6% HALS 1 | 0.6% UVA 2 | 41 | 48 |
| 3 | 0.6% HALS 4 | 0.6% UVA 2 | 29 | 34 |
| 4 | 0.6% HALS A | 0.6% UVA 2 | 59 | 69 |
| 5 | 0.6% HALS 1 | 0.6% UVA 3 | 32 | 38 |
| 6 | 0.6% HALS 4 | 0.6% UVA 3 | 21 | 25 |
| 7 | 0.6% HALS A | 0.6% UVA 3 | 39 | 46 |
| 8 | 0.6% HALS 1 | 0.6% UVA 5 | 49 | 58 |
| 9 | 0.6% HALS 4 | 0.6% UVA 5 | 29 | 34 |
| 10 | 0.6% HALS A | 0.6% UVA 5 | 65 | 76 |

*)z = destroyed

Serial numbers 4, 7 and 10 are examples in accordance the invention.

EXAMPLE 3

HALS combinations with UV absorbers of the o-hydroxyphenyltriazine class:

| No. | HALS | UV absorber | 20° gloss after 4000 hours | Residual gloss after 4000 h in % |
|---|---|---|---|---|
| 1 | none | none | 15 (3000 h, z*) | 17 (3000 h, z*) |
| 2 | 0.6% Hals 1 | 0.6% UVA 6 | 59 | 69 |
| 3 | 0.6% Hals 4 | 0.6% UVA 6 | 59 | 69 |
| 4 | 0.6% Hals A | 0.6% UVA 6 | 63 | 74 |
| 5 | 0.6% Hals 1 | 0.6% UVA 7 | 68 | 80 |
| 6 | 0.6% Hals 4 | 0.6% UVA 7 | 65 | 76 |
| 7 | 0.6% Hals A | 0.6% UVA 7 | 68 | 80 |

*)z = destroyed

Serial numbers 4 and 7 are examples in accordance with the invention.

In Examples 1 to 3 the samples stabilized with HALS A show greater stability to weathering than samples comprising an equal amount of a HALS which does not absorb UV light and is not photoreactive.

EXAMPLE 4

| No. | Hals | UV absorber | 20° gloss after 4500 hours | Residual gloss after 4500 h in % |
|---|---|---|---|---|
| 1 | none | none | | |
| 2 | 0.8% HALS 1 | 1.2% UVA 1 | | 20 |
| 3 | 0.8% HALS 1 | 1.2% UVA 6 | | 65 |
| 4 | 0.8% HALS A | 1.2% UVA 1 | | 75 |
| 5 | 0.8% HALS A | 1.2% UVA 6 | | 78 |
| 6 | 2.0% HALS A | none | | 81 |

Here it is evident, surprisingly, that the UV absorbing HALS A possesses on its own an effectiveness which is just as good as or even better than the combinations of UV absorbers and sterically hindered amines of the prior art, which are neither photoreactive nor absorb UV light, if it is used in a concentration corresponding to the combinations.

EXAMPLE 5

| No. | HALS | UV absorber | 20° gloss after 1750 hours | Residual gloss after 1750 h in % | Delta-b* |
|---|---|---|---|---|---|
| 1 | none | none | destroyed | | |
| 2 | 0.3% HALS 1 | 0.3% UVA 8 | 71 | 79 | 4.2 |
| 3 | 0.3% HALS 4 | 0.3% UVA 8 | 78 | 87 | 4.9 |
| 4 | 0.3% HALS A | 0.3% UVA 8 | 83 | 92 | 3.7 |
| 5 | 0.3% HALS 1 | 0.3% UVA 11 | 46 | 51 | 6.2 |
| 6 | 0.3% HALS 4 | 0.3% UVA 11 | 57 | 63 | 5.9 |
| 7 | 0.3% HALS A | 0.3% UVA 11 | 62 | 69 | 5.1 |

EXAMPLE 6

| No. | HALS | UV absorber | 20° gloss after 2000 hours | Residual gloss after 2000 h in % |
|---|---|---|---|---|
| 1 | none | none | 33 | 36 |
| 2 | 0.3% HALS 1 | 0.3% UVA 9 | 52 | 58 |
| 3 | 0.3% HALS 4 | 0.3% UVA 9 | 65 | 72 |
| 4 | 0.3% HALS A | 0.3% UVA 9 | 68 | 76 |
| 5 | 0.3% HALS 1 | 0.3% UVA 8 | 71 | 79 |
| 6 | 0.3% HALS 4 | 0.3% UVA 8 | 74 | 82 |
| 7 | 0.3% HALS A | 0.3% UVA 8 | 77 | 85 |
| 8 | 03.% HALS 1 | 0.3% UVA 11 | 51 | 57 |
| 9 | 0.3% HALS 4 | 0.3% UVA 11 | 55 | 61 |
| 10 | 0.3% HALS A | 0.3% UVA 11 | 61 | 68 |

The excellent effectiveness of the combinations of UV absorbers with the HALS A according to the invention is also evident in these examples. In addition, a clearly visible improvement in the yellowing tendency—expressed in the delta-b* values—of these combinations can be seen (Example 5).

What is claimed is:

1. A method of using a piperidine compound of the formula A

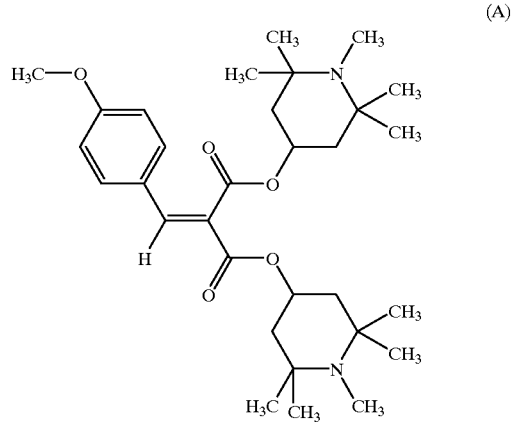

(A)

as a stabilizer against the effects of heat and/or UV light on automotive coating materials comprising adding the piperidine compound of the formula A to an automotive coating material to be stabilized, wherein the automotive coating material is a coating material based on a cold- or hot-crosslinkable alkyd, acrylate, polyester, epoxy or melamine resins or a mixture thereof, with or without the addition of an acidic curing catalyst, a two-component polyurethane coating material based on hydroxyl-containing, acrylate, polyester or polyether resins and on aliphatic or aromatic polyisocyanates, a one-component polyurethane coating material based on blocked polyisocyanates which are unblocked in the course of stoving, a two-component coating material based on (poly)ketimines and on aliphatic or aromatic polyisocyanates, a two-component coating material based on (poly)ketimines and on an unsaturated acrylate resin or a polyacetoacetate resin or a methylacrylamido glycolate methyl ester, a two-component coating material based on carboxyl- or amino-containing polyacrylates and polyepoxides, a two-component coating material based on acrylate resins containing anhydride groups and on a polyhydroxy or a polyamino component, a two-component coating material based on (poly)oxazolidines and on acrylate resins containing anhydride groups or on unsaturated acrylate resins or aliphatic or aromatic polyisocyanates, a two-component material based on unsaturated polyacrylates and polymalonates, a thermoplastic polyacrylate coating material based on thermoplastic acrylate resins or externally crosslinking acrylate resins in combination with etherified melamine resins, a coating system based on siloxane-modified acrylate resins, a coating system based on fluorine-modified acrylate resins, or a radiation-curable coating material.

2. The method of using according to claim 1, wherein the piperidine compound is added in the form of a mixture.

3. The method of using according to claim 2, wherein the mixture consists of the piperidine compound of the formula A and at least one UV absorber selected from the group consisting of 2-hydroxyphenylbenzotriazoles, 2-hydroxyphenyltriazines, 2-hydroxybenzophenone, oxalanilides and cinnamic acid derivatives.

4. The method of using according to claim 3, wherein the piperidine compound of the formula A and the UV absorber are in a ratio and the ratio of the piperidine compound of the formula A to UV absorber is from 10:1 to 1:10.

5. The method of using according to claim 4, wherein the ratio of the piperidine compound of the formula A to UV absorber is from 4:1 to 1:4.

6. The method of using according to claim 4, wherein the ratio of the piperidine compound of the formula A to UV absorber is from 3:1 to 1:3.

7. A method of stabilizing a coating material against degradation of a polymer material present in the coating material wherein the coating material is based on a cold- or hot-crosslinkable alkyd, acrylate, polyester, epoxy or melamine resins or a mixture thereof, with or without the addition of an acidic curing catalyst, a two-component polyurethane coating material based on hydroxyl-containing acrylate, polyester or polyether resins and on aliphatic or aromatic polyisocyanates, a one-component polyurethane coating material based on blocked polyisocyanates which are unblocked in the course of stoving, a two-component coating material based on (poly)ketimines and on aliphatic or aromatic polyisocyanates, a two-component coating material based on (poly)ketimines and on an unsaturated acrylate resin or a polyacetoacetate resin or a methylacrylamido glycolate methyl ester, a two-component coating material based on carboxyl- or amino-containing polyacrylates and polyepoxides, a two-component coating material based on acrylate resins containing anhydride groups and on a polyhydroxy or a polyamino component, a two-component coating material based on (poly)oxazolidines and on acrylate resins containing anhydride groups or on unsaturated acrylate resins or aliphatic or aromatic polyisocyanates a two-component material based on unsaturated polyacrylates and polymalonates, a thermoplastic polyacrylate coating material based on thermoplastic acrylate resins or externally crosslinking acrylate resins in combination with etherified melamine resins, a coating system based on siloxane-modified acrylate resins, a coating system based on fluorine-modified acrylate resins, or a radiation-curable coating material, and wherein the degradation is induced by atmospheric oxygen, moisture, heat and/or UV light, comprising adding a piperidine compound of the formula A

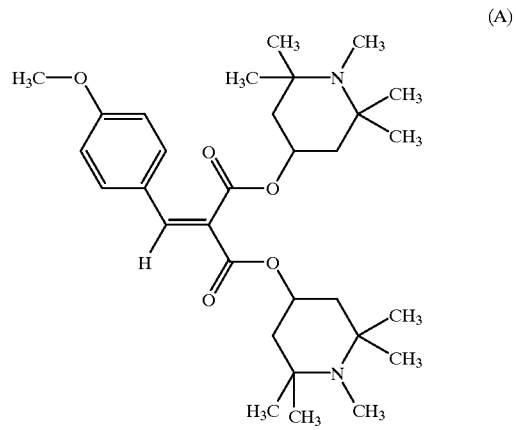

to the coating material to be stabilized in a concentration of from 0.2 to 5% by weight, based on the solids content of the coating material.

8. The method according to claim 7, wherein the piperidine compound of the formula A is added in a concentration of from 0.5 to 1.5% by weight, based on the solids content of the coating material.

9. A method of stabilizing a coating material against degradation of a polymer material present in the coating material wherein the coating material is based on a cold- or hot-crosslinkable alkyd, acrylate, polyester, epoxy or melamine resins or a mixture thereof with or without the addition of an acidic curing, catalyst, a two-component polyurethane coating material based on hydroxyl-containing acrylate, polyester or polyether resins and on aliphatic or aromatic polyisocyanates, a one-component polyurethane coating material based on blocked polyisocyanates which are unblocked in the course of stoving, a two-component coatings material based on (poly)ketimines and on aliphatic or aromatic polyisocyanates, a two-component coating material based on (poly)ketimines and on an unsaturated acrylate resin or a polyacetoacetate resin or a methylacrylamido glycolate methyl ester, a two-component coating material based on carboxyl- or amino-containing polyacrylates and polyepoxides, a two-component coatings material based on acrylate resins containing anhydride groups and on a polyhydroxy or a polyamino component, a two-component coating material based on (poly)oxazolidines and on acrylate resins containing anhydride groups or on unsaturated acrylate resins or aliphatic or aromatic polyisocyanates, a two-component material based on unsaturated polyacrylates and polymalonates, a thermoplastic polyacrylate coating material based on thermoplastic acrylate resins or externally crosslinking acrylate resins in combination with etherified melamine resins, a coating system based on siloxane-modified acrylate resins, a coating system based on fluorine-modified acrylate resins, or a radiation-curable coating material, and wherein the degradation is induced by atmospheric oxygen, moisture, heat and/or UV light, comprising adding a mixture consisting of a piperidine compound of the formula A

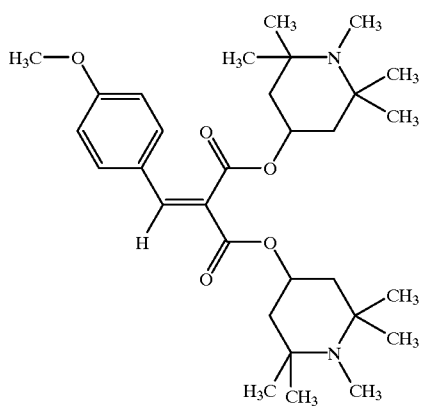

and at least one UV absorber selected from the group consisting of 2-hydroxyphenylbenzotriazoles, 2-hydroxyphenyltriazines, 2-hydroxybenzophenone, oxalanilides and cinnamic acid derivatives.

10. The method according to claim 9, wherein the piperidine compound of the formula A is added in a concentration of from 0.5 to 1.5% by weight, based on the solids content of the coating material.

11. A stabilized coating material comprising from 0.2 to 5% by weight of a piperidine compound of the formula A

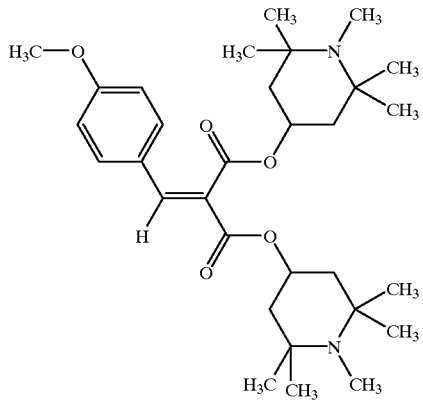

wherein the weight is based on the solids content of the coating material and wherein the coatings material is based on a cold- or hot-crosslinikable alkyd, acrylate, polyester, epoxy or melamine resins or a mixture thereof, with or without the addition of an acidic curing catalyst, a two-component polyurethane coating material based on hydroxyl-containing, acrylate, polyester or polyether resins and on aliphatic or aromatic polyisocyanates, a one-component polyuethane coating material based on blocked polyisocyanates which are unblocked in the course of stoving, a two-component coating material based on (poly) ketimines and on aliphatic or aromatic polyisocyanates, a two-component coatings material based on (poly)ketimines and on an unsaturated acrylate resin or a polyacetoacetate resin or a methylacrylamido glycolate methyl ester, a two-component coating material based on carboxyl- or amino-containing polyacrylates and polyepoxides, a two-component coating material based on acrylate resins containing anhydride groups and on a polyhydroxy or a polyamino component, a two-component coating material based on (poly)oxazolidines and on acrylate resins containing anhydride groups or on unsaturated acrylate resins or aliphatic or aromatic polyisocyanates, a two-component material based on unsaturated polyacrylates and polymalonates, a thermoplastic polyacrylate coating material based on thermoplastic acrylate resins or externally crosslinking acrylate resins in combination with etherified melamine resins, a coating system based on siloxane-modified acrylate resins, a coating system based on fluorine-modified acrylate resins, or a radiation-curable coating material.

12. The stabilized coating material according to claim 11, wherein the stabilized coating material is an automotive coating material.

13. The stabilized coating material according to claim 11, wherein the stabilized coating material comprises from 0.5 to 1.5% by weight of the piperline compound of the formula A, wherein the weight is based on the solids content of the coating material.

14. A stabilized coating material comprising a mixture consisting of a piperidine compound of the formula A

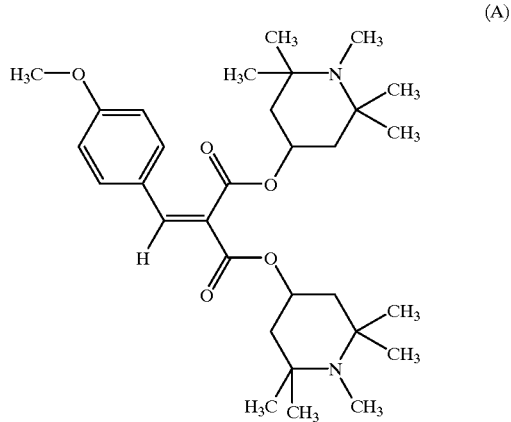

and at least one UV absorber selected from the group consisting of 2-hydroxyphenylbenzotriazoles, 2-hydroxyphenyltriazines, 2-hydroxybenzophenone, oxalanilides and cinnamic acid derivatives, wherein the coating material is based on a cold- or hot-crosslinkable alkyd, acrylate, polyester, epoxy or melamine resins or a mixture thereof, with or without the addition of an acidic curing catalyst, a two-component polyurethane coating material based on hydroxyl-containing acrylate, polyester or polyether resins and on aliphatic or aromatic polyisocyanates, a one-component polyurethane coating material based on blocked polyisocyanates which are unblocked in the course of stoving, a two-component coating material based on (poly)ketimines and on aliphatic or aromatic polyisocyanates, a two-component coating material based on (poly)ketimines and on an unsaturated acrylate resin or a polyacetoacetate resin or a methylacrylamido glycolate methyl ester, a two-component coating material based on carboxyl- or amino-containing polyacrylates and polyepoxides, a two-component coating material based on acrylate resins containing anhydride groups and on a polyhydroxy or a polyamino component, a two-component coating material based on (poly)oxazolidines and on acrylate resins containing anhydride groups or on unsaturated acrylate resins or aliphatic or aromatic polyisocyanates, a two-component material based on unsaturated polyacrylates and polymalonates, a thermoplastic polyacrylate coating material based on thermoplastic acrylate resins or externally crosslinking acrylate resins in combination with etherified melamine resins, a coating system based on siloxane-modified acrylate resins, a coating system based on fluorine-modified acrylate resins, or a radiation-curable coating material.

15. The stabilized coating material according to claim 14, wherein the stabilized coating material is an automotive coating material.

* * * * *